UNITED STATES PATENT OFFICE.

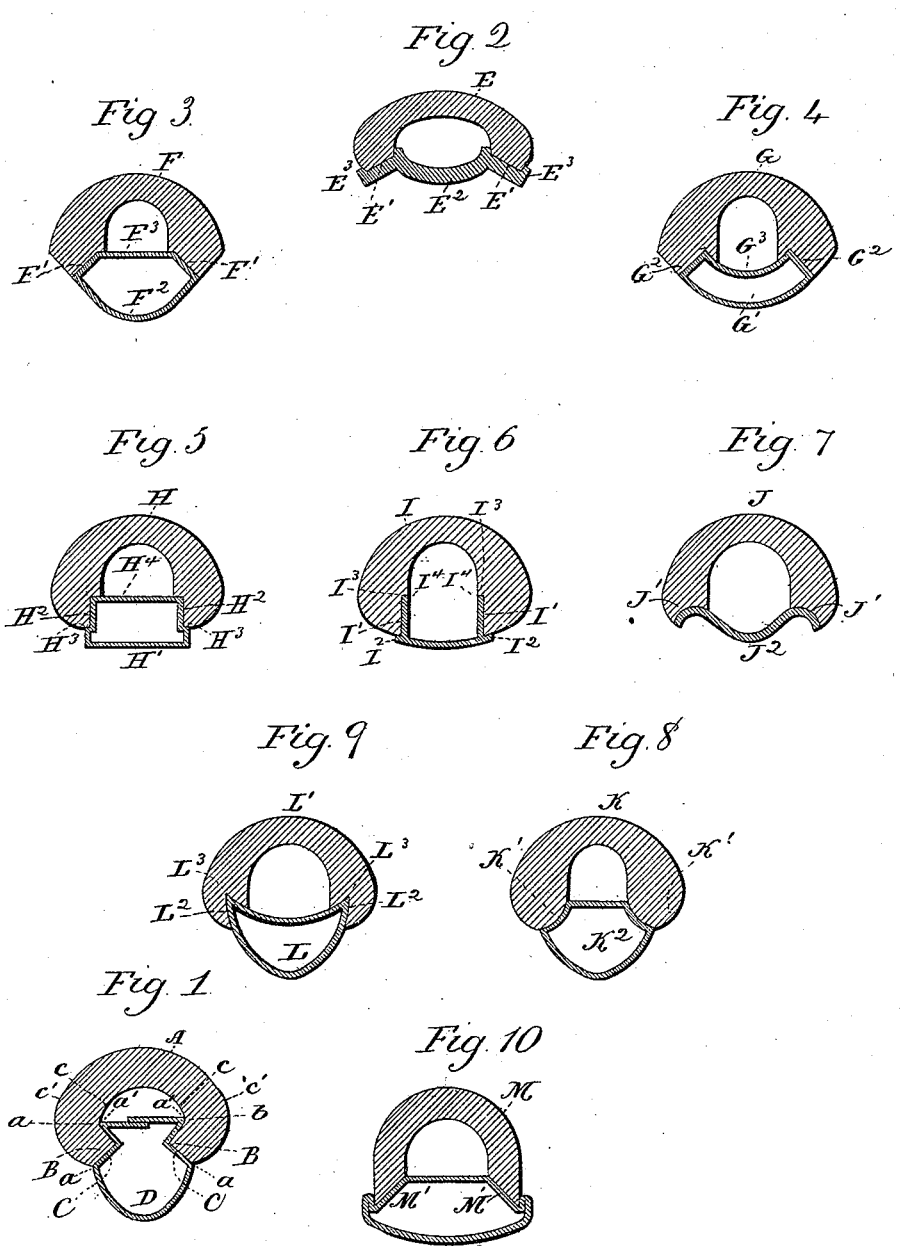

CHARLES E. W. WOODWARD, OF CHICOPEE FALLS, MASSACHUSETTS, ASSIGNOR TO THE OVERMAN WHEEL COMPANY, OF SAME PLACE.

VEHICLE-WHEEL.

SPECIFICATION forming part of Letters Patent No. 464,767, dated December 8, 1891.

Application filed November 24, 1890. Serial No. 372,444. (No model.)

*To all whom it may concern:*

Be it known that I, CHARLES E. W. WOODWARD, of Chicopee Falls, in the county of Hampden and State of Massachusetts, have invented a new Improvement in Vehicle-Wheels; and I do hereby declare the following, when taken in connection with accompanying drawings and the letters of reference marked thereon, to be a full, clear, and exact description of the same, and which said drawings constitute part of this specification, and represent, in—

Figure 1, a view in transverse section of a rim and tire constructed in accordance with my invention; Figs. 2 to 10, inclusive, views of modified forms which they may assume.

Heretofore hollow or inflatable tires have been objectionable on account of their liability to tear or fracture on or near the line of their attachment to the rim, where the particles of rubber, by reason of their attachment thereto, are prevented from moving and adapting themselves to stress without being forced beyond the limits of cohesion and on account of their liability to roll and slide under severe lateral strain.

The object of my invention is to overcome these difficulties and to produce a tire at once durable and stable.

With these ends in view my invention consists in a wheel-rim having two outwardly-inclined seats for the tire to rest upon.

My invention further consists in a tire having its outer edges attached to the rim at lower points thereon than its inner edges, whereby a protecting body of practically inert rubber is secured between the outer lines of juncture and the lines on which the severest tearing strain is exerted.

My invention further consists in a tire having its side walls thickened upon their outer faces, and in certain details of construction and combinations of parts, as will be hereinafter described, and pointed out in the claims.

It will be seen by an examination of the drawings that all of the tires shown therein are arch-shaped in transverse section, that their inner side walls are shorter than their outer side walls, and that the side walls of all of the arches are thickened near their bases upon their outer faces, with the exception of the tire shown by Fig. 10 of the drawings, which is of uniform thickness. It will be noticed, also, that the outer edges of all of the tires shown by the several figures of the drawings bear upon the respective rims at lower points thereupon than their inner edges, and that all of the rims, except those represented in Figs. 5, 6, and 8 of the drawings, have outwardly-inclined seats. By making the inner side walls of the tires shorter than their outer side walls and providing the rims with outwardly-inclined seats the tires are braced against lateral action, while by making the outer side walls of the tires relatively longer than their inner side walls a freer outward or lateral displacement of the tires is secured, thus favoring the inward displacement under pressure of their middle or crowning portions into their interior spaces, whereby a stable bearing-face for the wheel to roll upon is obtained. By thickening the side walls of the tires at their bases, as described, they are re-enforced where the greatest lateral strain is exerted, and being so re-enforced are rendered less liable to roll and slide than tires of uniform thickness. By thickening the tires upon the outer rather than the inner faces of their side walls their interior spaces are not contracted and the tires are caused to project beyond the rims, which are thus protected if they are made narrower than the tires, which is their preferred construction. The location of the extra rubber upon the outer faces of the side walls of the tires also enables a greater cushioning effect to be secured from the rubber than if it were otherwise disposed, inasmuch as when so located it is free to move under pressure. By joining the outer edges of the tires to the rim at lower points thereon than their inner edges the outer lines of juncture, which are the lines on which the severest tearing strains are exerted in tires as ordinarily applied, are taken out of the range of those strains, which are exerted with the greatest severity on lines passing transversely through those portions of the rim nearest to the crown of the tire, which will be broken down, so to speak, over the rigid points of the rim nearest to the pressure. Although it is true that the juncture of the inner edges of the tire with the rim are left, under my construction, necessarily in line with the lateral or tearing strains, they are very much protected by the body of rubber between them and the outer surfaces of the tire and by the practically inert body of rubber between the lines of lateral strain, which I have indicated in Fig. 1 of the drawings by the broken line $a\, b$, and the juncture of the outer edges of the tire with the rim. It will be observed, finally, that the side walls of all of the tires take an endwise bearing upon their rims.

Having now spoken of the peculiarities of my improved construction and set forth some of the advantages which accrue from them, I will now proceed to describe the specific forms of tires and rims which I have chosen for illustration.

As shown by Fig. 1 of the drawings, the tire A, which in transverse section has the form of a low arch, has the bases of its side walls turned inwardly and shaped to form pointed ends B B, which fit into deep grooves C C, formed in the opposite sides of the hollow rim D, the lower walls of the said grooves forming outwardly-inclined seats for the bases of the tire to bear upon. It will be observed that the outer edges $a\, a$ of the tire are attached to the rim at points thereon considerably lower than its inner edges $a'\, a'$, thus securing a considerable body of virtually-inert rubber between the points $a\, a$ and the broken line $a\, b$, which is the line where the severest tearing strain is exerted. It will be noticed, also, that the inner side walls $c\, c$ of the tire are much shorter than the outer side walls $c'\, c'$ thereof, whereby the said short inner walls, together with the outwardly-inclined seats before mentioned, form braces to resist lateral strain upon the tire. It will be noticed, also, that the side walls of the tire are thickened upon their outer faces, whereby the tire is re-enforced against lateral strain, and therefore against tearing and fracture. The tire in this case is much broader than the rim is wide, wherefore the tire is left free to be displaced laterally and the rim protected against injury. The rim D, by virtue of its peculiar construction, takes a wedge-shaped form within the tire and prevents the same from being torn away from it radially.

The tire E (shown by Fig. 2 of the drawings) is broader and lower than the tire A and supported upon the outwardly-inclined seats E' E' of a solid rim E$^2$, provided with flanges E$^3$ upon the opposite edges of its seats for retaining the tire in place, the bases of the side walls of the tire being beveled to correspond to the inclination of the seats. The outer faces of the side walls of this tire are also thickened near the bases thereof for the purposes specified in connection with the description of the tire shown by Fig. 1.

The tire F (shown by Fig. 3 of the drawings) has an arch of somewhat more stilted form and is supported upon the outwardly-inclined seats F' F' of a hollow rim F$^2$, the bases of the side walls of the tire being shaped to correspond to the inclination of the said seats and to lap for a short distance upon the tread F$^3$ of the tire, the feature of construction last mentioned facilitating the placing of the tire upon the rim for its compression in being affixed thereto.

The tire G (shown by Fig. 4 of the drawings) is affixed to a hollow rim G', having outwardly-inclined seats G$^3$ G$^2$ and a concave tread G$^3$, the feature of construction last mentioned securing a greater interior space for the inward displacement of the tire. In this case, also, the inner edges of the tire are lapped over upon the tread in order to facilitate securing it to the rim.

The tire H (shown by Fig. 5 of the drawings) is secured to a hollow rim H', having vertical seats H$^2$ H$^2$, terminating at their lower ends in shoulders H$^3$ H$^3$. In this case, also, the inner edges of the tire are overlapped upon the flat tread H$^4$ of the rim. Although this rim has no outwardly-inclined seats, yet the outer edges of the tire are joined to the rim at lower points thereon than its inner edges, whereby this form of tire is brought within one of the fundamental features of my invention.

Fig. 6 of the drawing shows a construction broadly corresponding to the construction shown by Fig. 5, the essential difference being that the tire I is solid instead of hollow. It has vertical seats I' I', terminating at their lower ends in retaining-flanges I$^2$ I$^2$, the inner edges I$^3$ I$^3$ of the tire being seated upon the inner edges I$^4$ I$^4$ of the rim.

In the construction shown by Fig. 7 of the drawings the tire J has its ends secured to outwardly-inclined but convex seats J' J', formed at the edges of a curved solid rim J$^2$.

The tire K (shown by Fig. 8 of the drawings) has the bases of its side walls rounded and adapted to be fitted into outwardly-inclined but concave seats K' K', formed in the hollow rim K$^2$.

Fig. 9 of the drawings shows how my invention may be applied to an old crescentic rim L of ordinary construction, the bases of the side walls of a tire L', formed in accordance with my invention, being notched, as at L$^2$ L$^2$, to adapt them to fit over the horns L$^3$ L$^3$, so to speak, of the rim. It will be noticed that in this case, as well as in the preceding constructions, the outer edges of the tire join the rim at lower points thereon than its inner edges. In all of the constructions mentioned thus far the side walls of the tires have been thickened upon their outer faces and near their bases; but I have shown in Fig. 10 a construction in which that has not been done, the tire M being of uniform thickness and having the bases of its side walls beveled to correspond to the outwardly-inclined seats M' M' of the hollow rim M$^2$, which in this case is made in two parts. This construction, however, contains the feature of joining the outer edges of the tire at lower points on the rim than its inner edges.

All of the tires mentioned thus far are adapted to be used without inflation, although all of them may be hermetically secured to their rims and filled with compressed air, if desired.

Although I have shown only tires having interior spaces, my invention is applicable to solid tires in its feature of attaching their outer edges to lower points on the rim than their inner edges.

It is apparent that in carrying out my invention it may take still other forms than those herein shown and described. I would therefore have it understood that I do not limit myself to the said forms, but hold myself at liberty to make such changes and alterations as fairly fall within the spirit and scope of my invention.

Having fully described my invention, what I claim as new, and desire to secure by Letters Patent, is—

1. The combination, with a wheel-rim, of a hollow rubber tire constructed to have its outer edges take a bearing at lower points upon the rim than its inner edges, substantially as described.

2. The combination, with a wheel-rim having outwardly-inclined seats, of a hollow tire constructed to be supported upon the said seats, substantially as described.

3. The combination, with a wheel-rim having outwardly-inclined seats, of a tire having an interior open space and its side walls shaped to take an endwise bearing upon the said seats, their outer edges being secured to the rim at lower points thereon than their inner edges, substantially as described.

4. The combination, with a wheel-rim having outwardly-inclined seats, of a tire having an interior open space and its side walls beveled at their bases to take an endwise bearing upon the said inclined seats, and also thickened to increase the bulk of rubber to better resist lateral strains upon the tire, substantially as described.

5. The combination, with a wheel-rim having outwardly-inclined seats, of a tire having an interior open space and its side walls beveled at their bases to take an endwise bearing upon the said seats and thickened upon their outer faces to increase the bulk of material at the points of the greatest lateral strain without contracting the said interior space, substantially as described.

6. The combination, with a wheel-rim having each of its sides deeply grooved to form outwardly-inclined seats, of an arch-shaped tire having the bases of its side walls turned inwardly and pointed to fit into the said grooves, its outer edges being attached to the rim at lower points thereon than its inner edges, substantially as described.

In testimony whereof I have signed this specification in the presence of two subscribing witnesses.

CHARLES E. W. WOODWARD.

Witnesses:
W. P. HADLEY,
W. S. L. HAWKINS.